United States Patent [19]

Schwarz et al.

[11] Patent Number: 5,311,385
[45] Date of Patent: May 10, 1994

[54] MAGNETORESISTIVE HEAD WITH INTEGRATED BIAS AND MAGNETIC SHIELD LAYER

[75] Inventors: Theodore A. Schwarz, Woodbury, Minn.; Peter G. Bischoff, Cupertino, Calif.; Chak M. Leung, San Jose, Calif.; Johnny C. Chen, San Jose, Calif.; Pradeep Thayamballi, Fremont, Calif.

[73] Assignee: Minnesota Mining and Manufacturing Company, St. Paul, Minn.

[21] Appl. No.: 809,678

[22] Filed: Dec. 18, 1991

[51] Int. Cl.⁵ .............................................. G11B 5/39
[52] U.S. Cl. ................................................... 360/113
[58] Field of Search .................... 360/113; 324/252; 338/32 R

[56] References Cited

U.S. PATENT DOCUMENTS

| | | | |
|---|---|---|---|
| 3,493,694 | 2/1970 | Hunt | 179/100.2 |
| 3,813,692 | 5/1974 | Brock et al. | 360/113 |
| 3,814,863 | 6/1974 | O'Day et al. | 360/113 |
| 3,840,898 | 10/1974 | Bajorek et al. | 360/113 |
| 3,864,751 | 2/1975 | Beaulieu et al. | 360/113 |
| 3,881,190 | 4/1975 | Brock et al. | 360/113 |
| 3,887,945 | 6/1975 | Nepela et al. | 360/113 |
| 3,940,797 | 2/1976 | Brock et al. | 360/113 |
| 3,967,368 | 7/1976 | Brock et al. | 29/603 |
| 3,979,775 | 9/1976 | Schwarz | 360/113 |
| 4,255,772 | 3/1981 | Perez et al. | 360/113 |
| 4,516,179 | 5/1985 | Imakoshi et al. | 360/113 |
| 4,663,685 | 5/1987 | Tsang | 360/113 |
| 4,802,043 | 1/1989 | Sato et al. | 360/113 |
| 4,807,073 | 2/1989 | Takeura et al. | 360/113 |
| 4,885,649 | 12/1989 | Das | 360/113 |
| 4,918,554 | 4/1990 | Bajorek et al. | 360/113 |
| 4,928,188 | 5/1990 | Brock | 360/113 |

FOREIGN PATENT DOCUMENTS

| | | |
|---|---|---|
| 0107982 | 5/1984 | European Pat. Off. . |
| 53-39110 | 4/1978 | Japan . |
| 57-169918 | 10/1982 | Japan . |
| 60-18812 | 1/1985 | Japan . |
| 60-50712 | 3/1985 | Japan . |
| 60-79509 | 5/1985 | Japan . |
| 60-236110 | 11/1985 | Japan . |
| 61-230614 | 10/1986 | Japan . |

OTHER PUBLICATIONS

Japanese Abstract No. 55-67935, vol. 4, No. 110, Aug. 8, 1980.
IBM Technical Disclosure Bulletin, vol. 21, No. 8, Jan. 1979, Elser et al.

Primary Examiner—Robert S. Tupper
Attorney, Agent, or Firm—Gary L. Griswold; Walter N. Kirn; William B. Barte

[57] ABSTRACT

A thin-film magnetoresistive playback head having films providing magnetic shielding and magnetic bias. At least one of the magnetic shield layers is also conductive so that the functions of shielding and biasing are combined. Preferably, both shield layers are conductive. A multiple element channel head is disclosed in which the magnetic/conductive layers extend in series from one transducer section to the next, allowing a single bias current to bias all of the sections.

13 Claims, 4 Drawing Sheets

MAGNETORESISTIVE HEAD WITH INTEGRATED BIAS AND MAGNETIC SHIELD LAYER

BACKGROUND OF THE INVENTION

1. Field of the Invention

This invention relates to magnetic recording and playback heads and, in particular, to playback heads utilizing a magnetoresistive transducer element.

2. Description of the Prior Art

Magnetoresistive (MR) playback heads are now well known in the art, having been perhaps first described in U.S. Pat. No. 3,493,694 (Hunt), and subsequently improved and elaborated upon in a number of respects. Thus, for example, as described in U.S. Pat. No. 3,881,190, magnetoresistive head constructions are now well known in which a bias field is provided by including a conductive layer adjacent to the magnetoresistive layer, current flowing through the conductive layer producing a magnetic field which biases the MR element to produce a more linear response. The U.S. Pat. No. 3,881,190 further discloses the desirability of sandwiching the MR element between magnetic shielding layers to enable the use of an extended throat height in the MR element, thus providing a structure useful for short wavelength recording. Numerous variants of such constructions have subsequently been disclosed. One such variant employs a ferrite as the substrate on which successive thin films of insulators, MR elements, bias conductors, additional shield layers, etc., may be deposited, the ferrite shield thus intrinsically acting as a one shield element. It is also known to provide an additional MR layer functioning to carry a current to bias the operation of an adjacent MR layer.

SUMMARY OF THE INVENTION

In contrast to such prior art constructions, the present invention is directed to a shielded MR head in which the functions of magnetically shielding and biasing the MR element are combined in at least a single layer. The head of the present invention is thus intended for interacting with information recorded at magnetized areas spaced along a recording medium.

The head is a multiple layer, thin-film construction, and comprises a thin-film, magnetoresistive transducing element including at least a single layer of material exhibiting the magnetoresistive effect disposed between a pair of thin-film, magnetically-permeable members, at least one of which is also electrically conducting. The pair of magnetically permeable layers have opposing faces spaced apart a fixed distance on the order of, and less than, the shortest wavelength of said recorded information. The edge of each of the two permeable layers closest to the medium lies in the same plane as the edge of the MR element closest to the medium.

The magnetically permeable layer of an electrically conductive material thereby allows current passing therethrough to create an associated magnetic bias field for the MR element, while also magnetically shielding that element to enable reproduction of short wavelength recordings. The thickness of the magnetically-permeable layers is not less than three times the fixed distance between the permeable members, thereby ensuring the presence of sufficient magnetic material to appropriately shield the MR element.

Finally, the head further comprises means contacting the electrically-conductive, magnetically-permeable layer(s) for enabling current flow therethrough to produce the magnetic bias field.

In a preferred embodiment, the layer of MR material is configured to have a predetermined throat height extending away from the aforementioned plane, and each of the magnetically-permeable layers is configured to have a height extending away from that plane, which is in the range of one to ten times the stripe height of the MR element, thereby concentrating both the current passing through said electrically-conductive, magnetically-permeable layer and the resultant bias field in the vicinity of said transducing element.

Typically, the head also includes sense leads formed from at least one conductive layer, two portions of which are electrically separate from each other and in contact with the magnetoresistive element for enabling a sense current to pass therethrough, one edge of the portions also lying in the aforesaid plane. The distance between the portions at that plane thus define the length of the magnetoresistively-active region.

In a further preferred embodiment, all of the magnetically-permeable layers are electrically conductive, and the contacting means contacts all of the conducting, magnetically-permeable layers for enabling current flow in opposite directions therethrough, the resulting magnetic fields being additive. The head may also include the layer of MR material configured to have a plurality of electrically-separate portions, forming a plurality of spaced-apart transducing elements, each portion having an edge lying in the same plane and having means enabling a separate sense current to flow therethrough.

DETAILED DESCRIPTION

Figure 1:
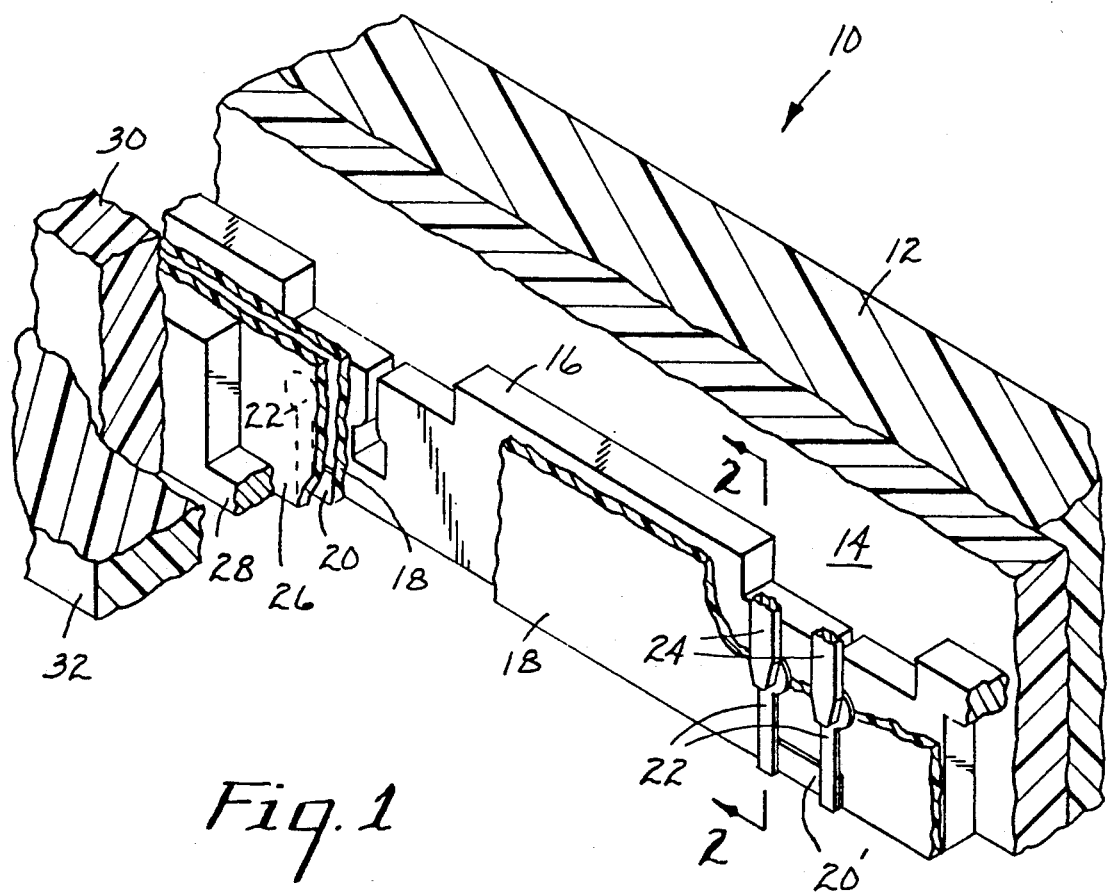
FIG. 1 is a partially broken away perspective of one embodiment of the thin-film magnetoresistive head of the present invention.

An exploded, partially broken away perspective view of a preferred embodiment of the head of the present invention comprising a plurality of separate, spaced-apart transducing elements is shown in FIG. 1. As there may be seen, the head 10 is formed of a number of various layers successively deposited upon a substrate 12. Typically, the substrate 12 is desirably formed of a fine-grained ceramic, such as $Al_2O_3.TiC$ or the like, having a polished surface suitable for deposition of the respective thin-film layers to be described hereafter. As a typical $Al_2O_3.TiC$ ceramic is sufficiently conductive to impair the performance of the resultant head, a first thin-film insulator layer 14, such as a layer of aluminum oxide ($Al_2O_3$), may first be deposited in the range 60,000 to 100,000 Å and thereafter polished to provide a 10,000 to 60,000 Å thick layer.

On top of the insulator 14 may then be formed a back shield layer 16, which layer is both magnetic and conductive so as to provide the functions of both shielding the resultant head from external magnetic fields, and, as current is passed through the layer, to provide a magnetic bias for the resultant transducers formed by the magnetoresistive sensor elements 20 and 20'. Such a shield layer 16 may thus preferably comprise an iron-nickel alloy, substantially corresponding to a permalloy composition, 82% Ni and 18% Fe, having a low-coercive force and high permeability, while also having a conductivity in the range of 20-28 micro-ohm-centimeters. The layer is desirably deposited to have a thickness in the range of 30,000–40,000 Å. As shown in the cutaway of the transducing sensor element 20, the back shield layer 16 is shaped with the region between sense leads removed to concentrate flux from the shield current next to the active region of the transducing sensor element, while still providing a flat surface over which subsequent thin-film layers may be deposited.

On top of the shield layer 16 may then be deposited a thin insulative layer 18, such as, for example, a 2,000 Å film of $Al_2O_3$ to prevent shorting out of adjacent conductive films. On top of the thin insulative layer 18 may then be deposited the magnetoresistive sensor elements 20 and 20', which comprise a short section of a low-coercive force, high-permeability alloy, such as an 82% Ni-18% Fe alloy, such films being deposited to a thickness of approximately 100-500 Å. A preferred embodiment is formed with a 300 Å thick film, having a height in excess of 10 microns, the excess then being removed during final head-forming operations such that a stripe height of up to 10 micron is provided.

Sense leads 22, comprising a 500-1000 Å conductive film, such as titanium, to reduce galvanic corrosion potential, while yet enabling appropriate connection to the transducing sensor elements, may next be deposited over the opposite ends of each of the magnetoresistive elements 20 and 20', the distance between each respective pair of sense leads 22 thereby defining the length of the resultant transducing sensor element. The end of the sense leads 22 opposite the magnetoresistive elements are provided with pads over which may be formed contact leads 24 to allow external connections to the transducing/sensor elements. The contacts 24 may, for example, be formed of Cu or Au. These conductive members may then be covered with a thin insulative layer 26, such as a second 2,000 Å thick layer of $Al_2O_3$. Finally, a top shield 28 of high-permeability, low-coercive force, conductive film, such as an 82-18% nickel-iron alloy, approximately 30,000–40,000 Å, may be deposited over the second insulative layer 26. As seen in FIG. 1, the top shield layer 28 is also formed in a zigzag configuration such that flux resulting from current passing through that layer is concentrated in the region of the magnetoresistive sensor elements 20 and 20'.

The distance between the shield layers 16 and 28 thus defines the gap within which is positioned the magnetoresistive sensor elements 20 and 20'. The gap distance is desirably less than the shortest wavelength of recorded information to be reproduced, i.e., about 5,000 Å. Thus, in the embodiment described above, the gap is defined by the two 2,000 Å thick $Al_2O_3$ layers 18 and 26 and the sensor layer 20 thereby providing a gap width of approximately 4,000 Å. Also, the distance between each pair of the sense leads 22 defines the effective length of the sensor region.

A thick insulative layer 30, such as a 60,000 Å film of $Al_2O_3$, may be deposited over the top shield layer 28, and over that layer a cover element 32 may be subsequently clamped or bonded, as is conventional in thin-film head technology.

To ensure that each of the magnetic shield layers 16 and 28 concentrate sufficient flux, while also providing the requisite magnetic shielding, it is desired that the thickness of each of those respective layers be not less than three times the gap width. Thus, as noted above, the gap may preferably be in the range of 5,000 Å, while each of the shield layers 16 and 28 is preferably in the range of 25,000 to 50,000 Å. In particular, a thickness of about 30,000 Å is preferred.

Upon completion of the assembly by the addition of the cover 32, the bottom surface of the completed assembly is then ground and polished to provide an appropriate contour at the air-bearing surface.

Figure 2:
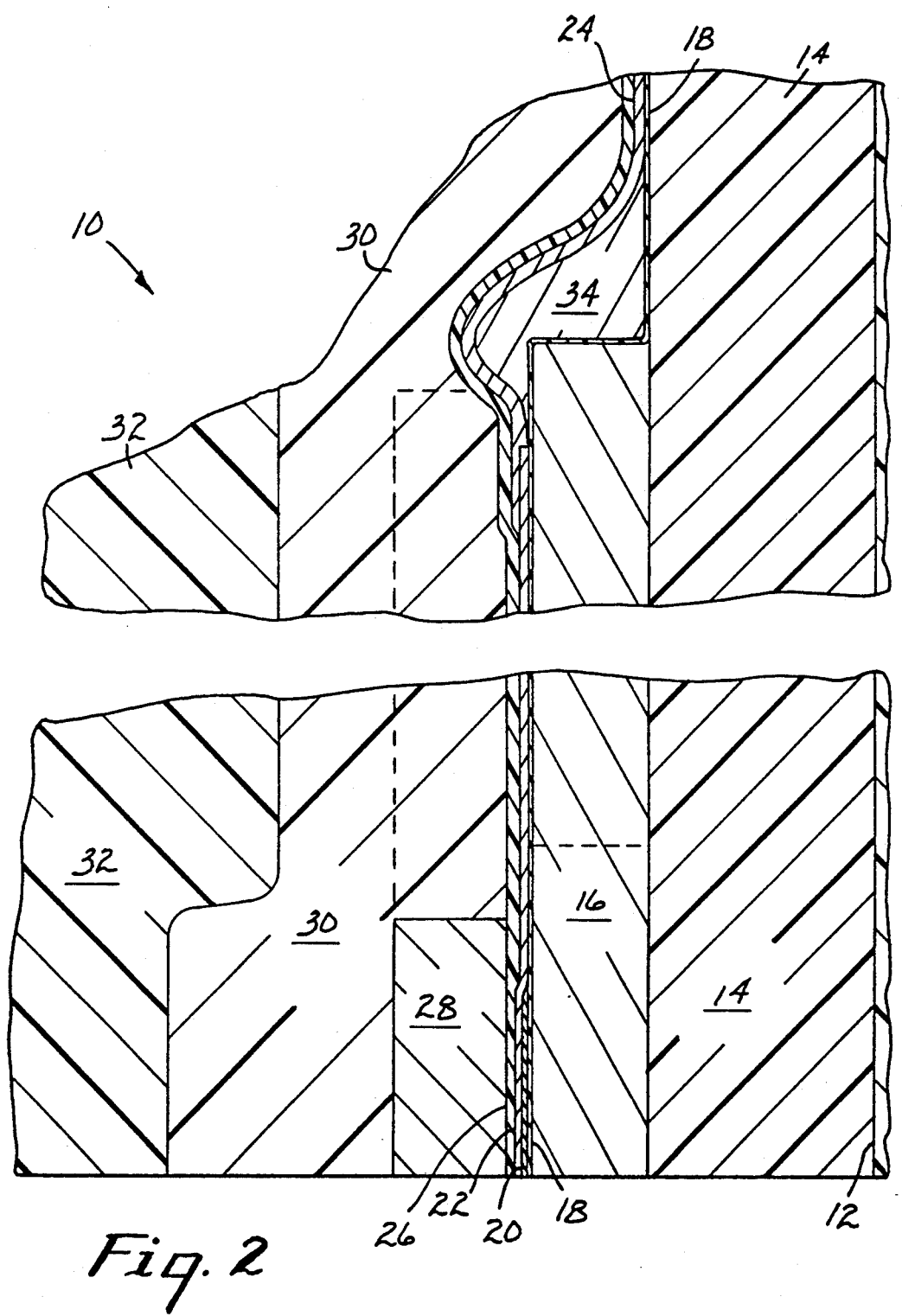
FIG. 2 is a cross-sectional view of the head shown in FIG. 1 taken along the lines 2—2.

A cross-sectional view of the head, as shown in FIG. 1, taken along the line 2—2, is shown in FIG. 2. As there may be seen, the substrate 12 has first deposited thereon a relatively thick film 14 of an insulator such as aluminum oxide. On top of that layer is then deposited the bottom shield layer 16, which extends away from the resultant air-bearing surface, a distance of approximately 130 micrometers. The thin insulative layers 18 and 26, the magnetoresistive sensor element 20, and the sense leads 22 are then deposited in the appropriate succession. The outer insulative layer 26 then has the top shield layer 28 deposited thereover, the upper insulative of layer 30 is deposited over the top shield layer 28, and the optional cover 32 is ultimately clamped or bonded to complete the assembly. The bottom shield layer 16 thus provides a structural platform for the magnetoresistive sensor element 20 and the sensor leads 22. Because of the requirement to connect the sense leads 22 beyond the bottom shield 16 at the edge opposite the air-bearing surface without breaking, interconnects are required so that a thicker lead goes over the outer edge of the shield layer 16. These thicker leads are thus provided by the contact leads 24. However, to further prevent the contact leads 24 from also shorting out to the underlying shield 16, it is preferable to provide an additional layer 34 of insulative material along the back edge of the shield layer 16 so that the contacts 24 remain positioned away from the back edge of the shield layer 16. Such a layer 34 may be desirably provided by a film of cured but unremoved photoresist or the like.

Also, because of the finite size required for the pads at the back edge of the sense leads 22, the bottom shield 16 needs to be considerably larger or taller than the magnetoresistive sensor element 20.

In order for the bottom shield to also work effectively as a conductor, thereby producing a bias field as current flows therethrough, the center cut-out between the sense lead pad is introduced so that the bottom shield is only slightly taller than the magnetoresistor sensor element 20 over the sense region. Thus, for example, where the magnetoresistive sensor element 20 has a throat height of about 10 microns, the bottom shield may have a height in that region of about 20-25 microns. Similarly, the top shield 28 may have a height in the sense region of about 15 microns. The narrow cross-section of both the top and bottom shields at the magnetoresistive center region thus allows the bias current in both the shield layers to achieve a much higher current density, thus introducing a stronger transverse bias magnetic field over the magnetoresistive sense region. Preferably, the sense of current flow in both of the shield layers is such that the resultant magnetic fields are additive over the magnetoresistive sensor.

Figure 3:
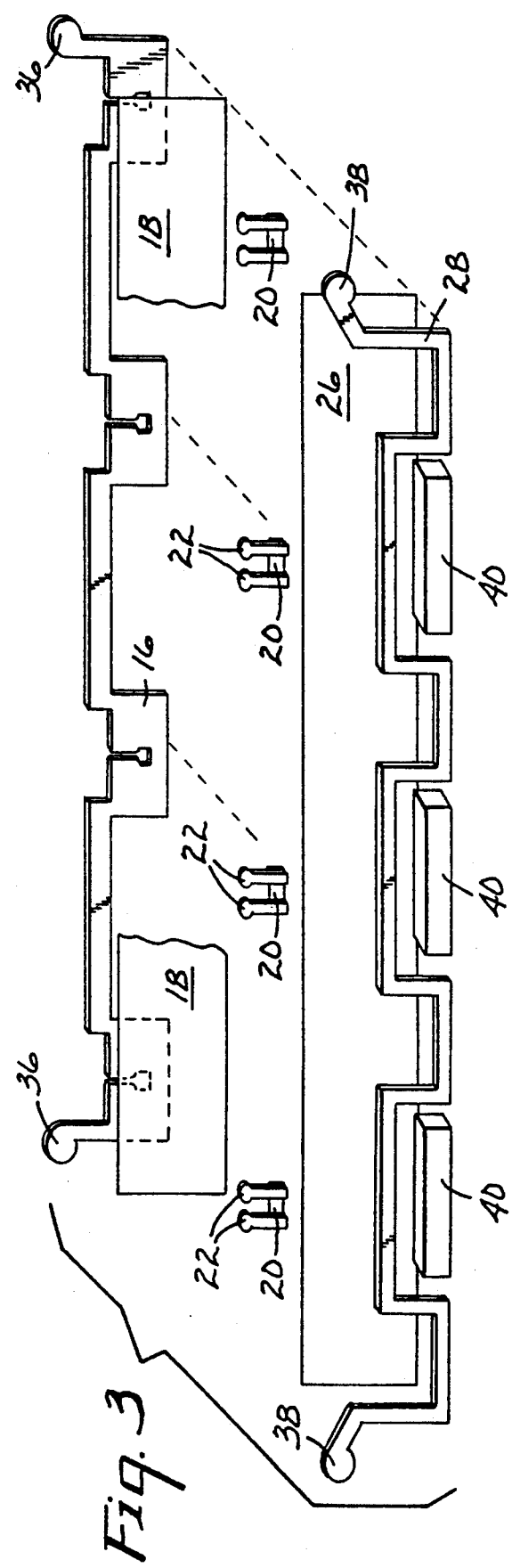
FIG. 3 is an exploded perspective view of a portion of the head shown in FIGS. 1 and 2, respectively, in which the upper and lower shields, MR elements, sense leads, and associated insulative layers are shown in a separated configuration for purposes of clarity.

An exploded view of a four-element, thin-film head according to the present invention is shown in FIG. 3. As is shown, each of the transducing elements includes a separate magnetoresistive element 20, having an individual pair of sense leads 22. If desired, the sense leads from one side of each of the individual transducers may also be coupled to provide a common ground lead. The individual magnetoresistive elements 20 and sense leads 22, respectively, are sandwiched between the thin insulative films 18 and 26. Those films in turn are sandwiched between the bottom shield and top shield layers 16 and 28. From this figure, it may be particularly recognized that the shields are coupled so that a current introduced at the respective terminals 36 and 38 flows in series through each of the shields associated with each of the four transducing elements.

It will also be there appreciated that the dimensions of the top shield 28 are desirably maintained to be slightly smaller than the overall dimensions of the bottom shield 16 so that the edges of the respective films do not cross over each other.

To compensate for the additional thickness in the resultant composite thin-film construction attributed to the magnetic films 16 and 28, it may further be desired to provide insulative spacer blocks 40 of an appropriate insulator, such as aluminum oxide, such that when the resultant element is completed by the addition of a cover block, as shown in FIG. 1, a more planar composite results.

Figure 4:
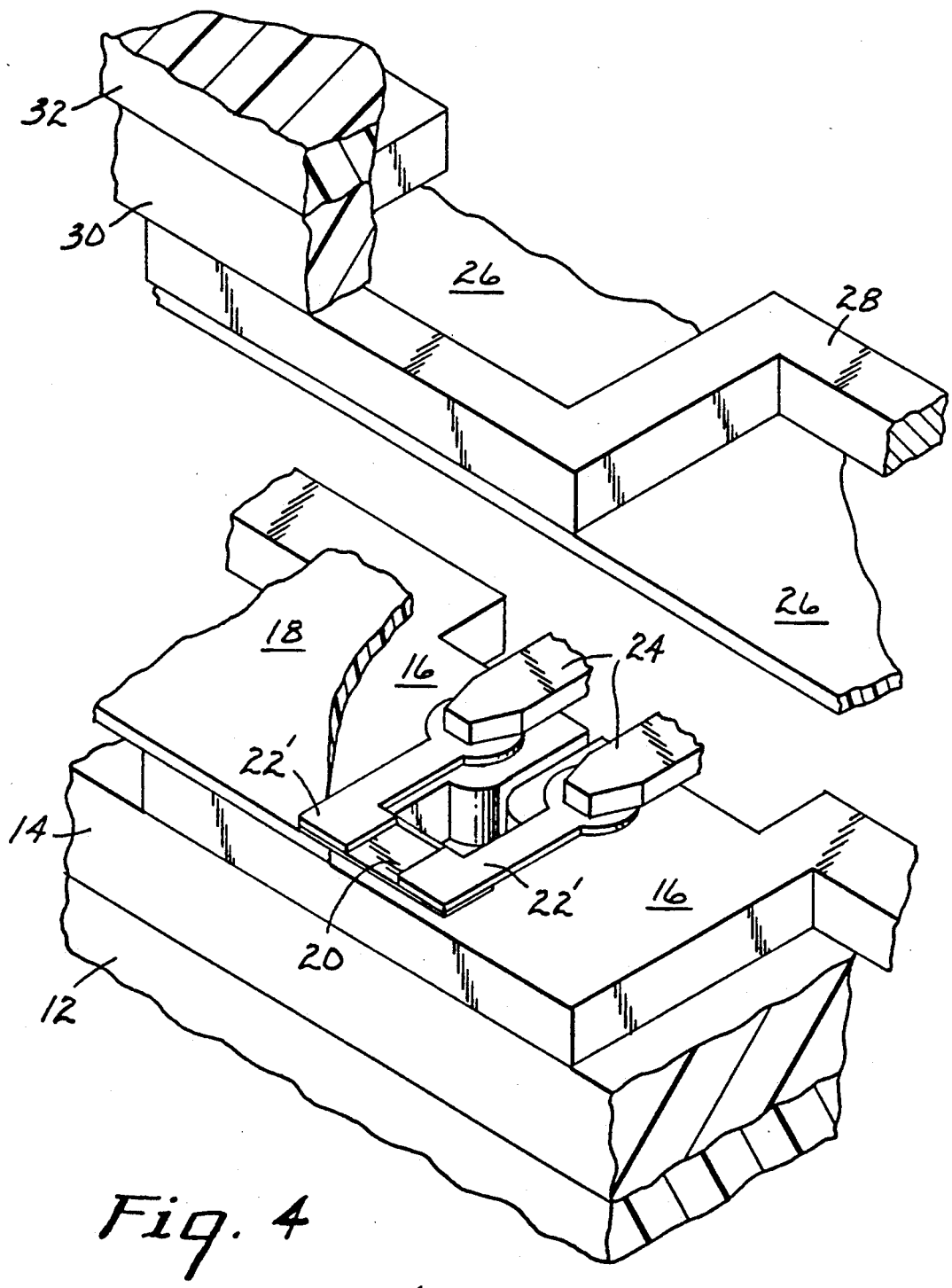
FIG. 4 is a broken away and exploded partial view of a head similar to that shown in FIG. I when viewed from a different direction and exploded to clarify a preferred electrode configuration about a single transducing element.

An expanded, partially broken away view of a slightly modified transducing element than that shown in the preceding drawings, viewed from the air-bearing surface, is further set forth in FIG. 4. As in the earlier described embodiment, the substrate 12 has deposited on a polished surface thereof, the first insulative layer 14. On top of that film is formed the bottom shield 16 having the desired keyhole slot region, and over the shield is then deposited the transducing/sensor element 20. In order that the track width of the sensor element be reduced, as defined by the distance between the sense leads, while yet allowing room for the keyhole slot region, the subsequently deposited sensor leads 22 are preferably formed in an "L" shape extending partly around the keyhole region of the shield 16. As the transducing element is subsequently completed with the addition of a thin-insulative layer 26, the top shield layer 28, and upper insulative layer 30, it will be noted that the heights of the respective shield layers 16 and 28 are somewhat greater than that of the magnetoresistive element 20, with the top shield 28 having smaller dimensions overall than that of the bottom shield 16.

An illustrative method of manufacturing the head, as shown in the respective figures, is as follows:

1. Surface of the substrate 12 is polished flat and cleaned.
2. An aluminum oxide film 14 is deposited on the surface of the substrate to a thickness of approximately 60,000 to 100,000 Å and is then polished to 10,000 to 60,000 Å.
3. A permalloy (82% nickel, 18% iron film) 16 is deposited to a thickness of approximately 30,000 Å. If desired, this film may be deposited in a magnetic field, causing the domains in the field to be aligned perpendicular to the resultant throat height.
4. A photoresist layer is applied over layer 16, exposed through suitable masks to define the desired keyhole structure, the undesired photoresist removed, and the exposed undesired portion of the magnetic layer 16 etched away.
5. A thin insulative film of aluminum oxide 18 is then deposited over the formed shield layer 16 to a thickness of about 2,000 Å.
6. A thin film of magnetoresistive material 20 having a thickness of about 300 Å and a height after grinding and polishing the resultant air-bearing surface of 1–10 microns is then deposited.
7. A conductive layer, ultimately forming the sense leads and pads 22 is then deposited to a thickness of about 750 Å. A film of a photoresist is applied thereover, the film is exposed through appropriately dimensioned masks, the undesired photoresist removed, and the resultant undesired portions removed to form the desired sense lead configurations.
8. A second thin insulative film 26 of aluminum oxide, approximately 2,000 Å, is then uniformly deposited over the formed transducer elements.
9. The top shield layer 28 of approximately 30,000 to 40,000 Å of permalloy is then deposited, covered by a photoresist, the photoresist exposed through a suitable mask to form the desired shield configuration, the undesired photoresist removed, and the undesired permalloy material etched away to form the resultant shield configuration.
10. The major leads of the MR sensors and shields are then formed by photoresist process and deposited with a conductive material like Cu so that the MR sensor and shields are connected to the bond pad.
11. The top insulative layer of approximately 60,000 to 100,000 Å of aluminum oxide is then deposited and polished to 10,000 to 60,000 Å and the housing 32 is then clamped to complete the subassembly.
12. Finally, the top surface of the completed subassembly and housing is ground and polished to a desired contour defining the air-bearing surface.

It will be appreciated that heads according to the present invention may be formed utilizing more than one magnetoresistive layer, each layer being separated from the adjacent one by an appropriate insulative layer. Also, it is not required that both the shield layers 16 and 28 be conductive. Thus, for example, one of the members alone can carry the bias current while the other member is formed of a magnetically-permeable, relatively-nonconducting material to which no current is applied.

While in the figures described hereinabove, the magnetoresistive element has been shown to be approximately equally positioned within the gap between the respective top and bottom shields, it may further be desirable that the magnetoresistive element be asymmetrically positioned to enhance biasing of the magnetoresistive element through preferential magnetic coupling to one of the shields.

The head of the present invention is particularly useful in a multi-channel head configuration, in which as many transducing elements as desired may be provided, with only a single bias current flowing through series-connected shielding elements. It is also within the scope of the present invention that such a single such transducing element may similarly be provided.

The invention has been described in detail, with particular reference to a preferred embodiment in which four such transducing elements is provided. It is understood that other variations and modifications can be effected within the spirit and scope of the invention.

What is claimed is:

1. A thin film magnetic head for interacting with information recorded at magnetized areas spaced along a recording medium, comprising
   a substrate having a non-conductive, non-magnetic surface, an edge defining a first plane adapted to be positioned adjacent to a said recording medium, and having deposited thereon;
   a magnetoresistive transducing element including at least a single layer of material exhibiting the magnetoresistive effects and having an edge lying in said first plane,
   a pair of magnetically permeable shield layers each of which is disposed adjacent to an opposite side of said magnetoresistive element and having opposing faces spaced apart a fixed distance on the order of and less than the shortest wavelength of said recorded information, an edge of each of the two permeable layers also lying in said first plane, at least one of said magnetically permeable layers being formed of an electrically conductive material,
   an insulating layer interposed between the at least one magnetoresistive element and the electrically conductive, magnetically permeable layer, thereby allowing current passing through said conductive material to create an associated magnetic bias field for the magnetoresistive element, while also magnetically shielding said magnetoresistive element to enable reproduction of short wavelength recordings, the thickness of said magnetically permeable layers being not less than three times said fixed distance between the permeable members, and
   means contacting said electrically conductive, magnetically permeable layer for enabling current flow therethrough, the resulting magnetic field biasing said magnetoresistive element.

2. A magnetic head according to claim 1, wherein said layer of material exhibiting the magnetoresistive effect is configured to have a predetermined stripe height extending away from said plane, and wherein each of said pair of magnetically permeable layers is configured to have a height extending away from said plane which is in the range of one to ten times said stripe height, thereby concentrating both the current passing through said electrically conductive, magnetically permeable layer and the resultant bias field in the vicinity of said transducing element.

3. A head according to claim 2, wherein said head further comprises sense leads in contact with said magnetoresistive element for enabling a sense current to pass therethrough, one edge of said leads also lying in said plane and the distance between said leads at said plane defining the length of the magnetoresistively active region.

4. A head according to claim 3, wherein the region proximate to an edge of one of said permeable layers is provided with an insulative overlayer extending both on top of that layer and along the adjacent edge thereof, thereby allowing said sense leads to pass thereover without shorting out therewith.

5. A magnetic head according to claim 1, further comprising layers of non-conductive and non-magnetic insulating material disposed between said transducing element and said magnetically permeable layers.

6. A head according to claim 1, wherein said transducing element comprises a magnetoresistive layer having a thickness in the range of 100 to 500 Å and a finished stripe height in the range of 1–15 micrometers and wherein each of said layers of permeable shield material has a thickness in the range of 25,000 to 100,000 Å.

7. A head according to claim 1, wherein all of said magnetically permeable layers are electrically conductive, and wherein said contacting means contacts all of said conducting layers for enabling current flow in opposite directions therethrough, the resulting magnetic fields being additive.

8. A head according to claim 1, wherein said layer of magnetoresistive material comprises a plurality of electrically separate portions, forming a plurality of spaced-apart transducing elements, each portion having an edge lying in said plane,
   a said pair of magnetically permeable layers, with each pair having electrically separate portions, is disposed on opposite sides of each separate portion of said magnetoresistive layer, and
   said contacting means contacts each portion of said electrically conductive, magnetically permeable layers for enabling a separate sense current to flow therethrough, the resultant center-to-center spacing between the respective elements thereby defining the spacing between adjacent tracks on a said recording medium accessible by said head.

9. A head according to claim 8, further comprising means for configuring at least one of said magnetically permeable layers to provide a continuous series current adjacent to all of said portions such that currents flowing through said permeable layer creates a bias field for each of said transducing elements.

10. A head according to claim 9, wherein all of said magnetically permeable layers are electrically conductive, and wherein said contacting means contacts all of said conducting layers for enabling current flow in opposite directions therethrough, the resulting magnetic fields being additive, and means for configuring one of said electrically conductive, magnetically permeable layers to have smaller overall dimensions than the other, thereby avoiding current paths in said smaller layer from crossing over an edge of the larger layer.

11. A head according to claim 1, wherein said magnetoresistive layer comprises a nickel-iron alloy having a low coercive force and high permeability in the frequencies at which the head is to be operated, and a conductivity in the range of 20–28 micro-ohm centimeters.

12. A head according to claim 1, wherein said magnetically permeable layers comprises a nickel-iron alloy having a low coercive force and high permeability in the frequencies at which the head is to be operated, and a conductivity in the range of 20–28 micro-ohm centimeters.

13. A head according to claim 1, wherein said magnetoresistive layer is asymmetrically positioned between said magnetically permeable layers, being closer to one of such layers.

* * * * *